United States Patent [19]

Lipo et al.

[11] Patent Number: 5,672,925
[45] Date of Patent: Sep. 30, 1997

[54] DOUBLY SALIENT VARIABLE RELUCTANCE MACHINE WITH STATIONARY PERMANENT MAGNETS OR AUXILIARY FIELD WINDINGS

[75] Inventors: Thomas A. Lipo, Middleton, Wis.; Yuefeng Liao, Schenectady, N.Y.; Feng Liang, Canton, Mich.

[73] Assignee: Electric Power Research Institute, Inc., Palo Alto, Calif.

[21] Appl. No.: 514,495

[22] Filed: Aug. 11, 1995

Related U.S. Application Data

[63] Continuation-in-part of Ser. No. 926,765, Aug. 6, 1992, abandoned.

[51] Int. Cl.[6] .................... H02K 21/26; H02K 1/00; H02K 17/42; H02K 1/12
[52] U.S. Cl. .................... 310/154; 310/181; 310/168; 310/258
[58] Field of Search .................... 310/258, 154, 310/168, 181, 254, 179, 261, 162, 166

[56] References Cited

U.S. PATENT DOCUMENTS

| | | | |
|---|---|---|---|
| 2,539,569 | 1/1951 | Clark | 171/212 |
| 2,816,240 | 12/1957 | Zimmerman | 310/155 |
| 3,616,761 | 11/1971 | Valls | 104/148 R |
| 3,783,502 | 1/1974 | Richter et al. | 29/598 |
| 3,862,445 | 1/1975 | Volkrodt | 310/154 |
| 3,984,711 | 10/1976 | Kordick | 310/49 R |
| 4,011,479 | 3/1977 | Volkrodt | 310/186 |
| 4,081,703 | 3/1978 | Madsen et al. | 310/49 R |
| 4,097,754 | 6/1978 | Farr | 310/67 R |
| 4,110,646 | 8/1978 | Rao | 310/163 |
| 4,217,513 | 8/1980 | Kohzai et al. | 310/186 |
| 4,348,605 | 9/1982 | Torok | 310/168 |
| 4,472,651 | 9/1984 | Jones | 310/156 |
| 4,629,921 | 12/1986 | Gavaletz | 310/156 |
| 4,631,510 | 12/1986 | Nagarkatti et al. | 336/135 |
| 4,712,028 | 12/1987 | Horber | 310/49 R |
| 4,733,117 | 3/1988 | Perrins | 310/162 |
| 4,752,707 | 6/1988 | Morrill | 310/184 |
| 4,827,164 | 5/1989 | Horber | 310/49 R |
| 4,916,346 | 4/1990 | Kliman | 310/216 |
| 4,939,398 | 7/1990 | Lloyd | 310/156 |
| 5,051,640 | 9/1991 | Freise | 310/162 |
| 5,059,884 | 10/1991 | Shah et al. | 318/701 |
| 5,117,144 | 5/1992 | Torok | 310/269 |
| 5,304,882 | 4/1994 | Lipo et al. | 310/156 |
| 5,455,473 | 10/1995 | Lipo et al. | 310/114 |

*Primary Examiner*—Steven L. Stephan
*Assistant Examiner*—Michael Wallace, Jr.
*Attorney, Agent, or Firm*—Leonard Bloom

[57] ABSTRACT

A new class of doubly-salient machines which incorporates a specific stator/rotor pole arrangement to provide a linearly increasing flux linkage over the entire area of pole overlap, and either (1) stationary permanent magnets mounted in the stator, or (2) one or more auxiliary field windings coiled about the stator or (3) a combination of stationary permanent magnets and auxiliary field windings. In each of the three cases, the permanent magnets or auxiliary winding(s) generate the primary flux and block and thereby limit flux in the ordinary path of the secondary flux (due to the stator windings) through the stator. The altered magnetic structure utilizing four stator and six rotor poles increases efficiency when operated as a generator, and provides greater output torque when operated as a motor.

19 Claims, 7 Drawing Sheets

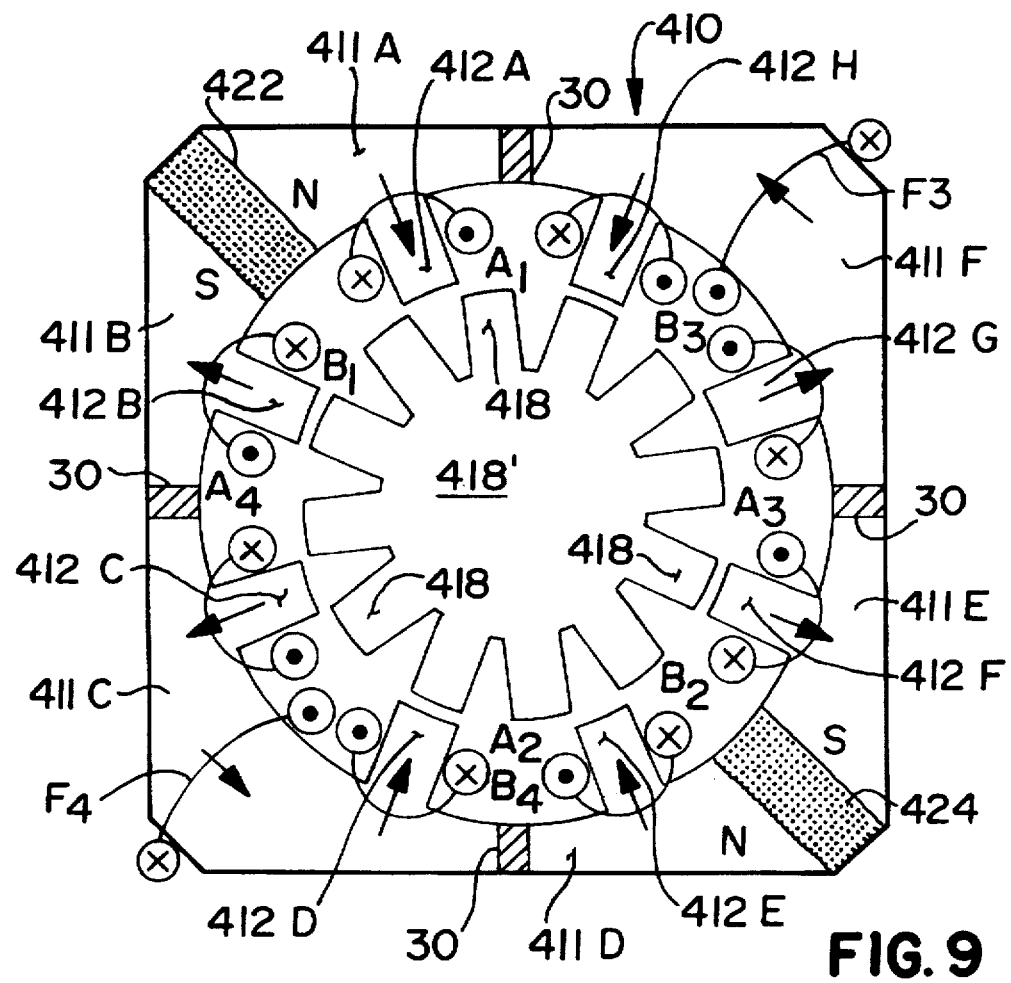
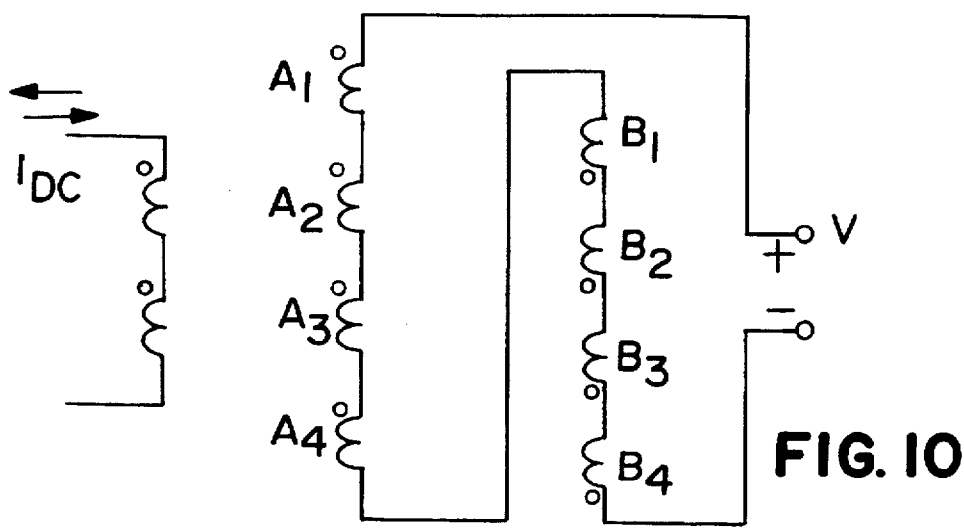
FIG. 9
FIG. 10

DOUBLY SALIENT VARIABLE RELUCTANCE MACHINE WITH STATIONARY PERMANENT MAGNETS OR AUXILIARY FIELD WINDINGS

CROSS-REFERENCE TO RELATED APPLICATIONS

The present application is a continuation-in-part of application Ser. No. 07/926,765, filed Aug. 6, 1992, now abandoned.

FIELD OF THE INVENTION

The present invention relates to variable reluctance machines and, more particularly, to high-output variable reluctance machines (operable as a motor or generator) having a doubly salient structure with stationary permanent magnets in the stator or with an auxiliary stator field winding. The doubly salient structure works with the permanent magnets or auxiliary field winding to alter the magnetic circuit of the motor, thereby improving the flux linkage variation during current commutation.

BACKGROUND OF THE INVENTION

In a variable reluctance motor (VRM), torque is generated by a doubly-salient rotor and stator which tend to align themselves in order to reach a position of minimum magnetic reluctance. Under ideal switching conditions, VRMs have the potential to be highly efficient. Moreover, VRMs can be constructed with shorter end-windings, and they use less end-space. Hence, the length of the rotor and stator can be increased without adding to the overall motor dimensions or manufacturing costs. In this manner, the torque output can be increased substantially over a comparably-sized synchronous or induction motor.

Thus far, the VRM has fallen short of its above-described potential for two reasons. First of all, like all single excited motors, the VRM suffers from an "excitation penalty," i.e., the armature current must provide an excitation component. Hence, the VRM has a lower efficiency and lower power factor (or energy ratio) as compared with other motors wherein the stator current is solely for torque production. Secondly, ideal switching conditions do not exist, and attempts to achieve such conditions have resulted in commercially impractical converter circuits with excessive voltage and current stresses imparted to the switching devices. In a continuous drive variable reluctance motor, the current in each phase should be decreased to zero immediately when the rotor is aligned with that phase. The problem lies in the existence of a large turn-off inductance. The phase inductance is a maximum when the rotor is aligned with that phase. Since this large inductance will draw a residual current due to the energy stored in the magnetic field, the current in each phase cannot immediately be decreased to zero when the rotor reaches alignment. Consequently, the decaying residual current induces a detrimental reverse-torque as the rotor pole passes alignment with the corresponding stator pole. The problem is most serious when the speed of the motor is high. As a result, those skilled in the art view present VRM technology with some skepticism. Synchronous or induction motors remain the industry choice.

It would be greatly advantageous to realize the full potential of a VRM by solving the above-described problems without increasing the complexity and cost of the converter or the motor. U.S. Pat. No. 5,304,882, owned by the assignee of the present invention, provides one solution in the form of a high output permanent magnet motor incorporating one or more permanent magnets in the rotor.

Co-pending application Ser. No. 07/926,765, filed Aug. 6, 1992, of which the present application is a continuation-in-part, suggests another solution in the form of a high-output three or more phase PM motor incorporating stationary permanent magnets in the stator. While these structures can be used for generator as well as motor operation, they are not optimum for generator operation for the reason that the phase windings do not carry current continuously and thus fail to make full use of the copper involved.

SUMMARY OF THE INVENTION

It is an object of the present invention to provide a variable reluctance machine having a doubly-salient structure and stationary permanent magnets in the stator to provide a machine capable of efficient, economical use as, either a motor or generator, but particularly as a generator.

It is another object of the invention to provide a machine as described above in which the stationary permanent magnets in the stator are replaced by auxiliary field winding(s) to accomplish like results.

It is another object to provide a variable speed drive system with greater output torque, a simpler electronic power supply and a simpler structure in comparison to conventional motor drives.

It is another object of the present invention to accomplish objectives similar to those set forth in co-pending application Ser. No. 07/926,765 in a one or more phase machine which, by altering the stator pole/rotor pole ratio of said '765 machine, is better suited for use as a generator than as a motor.

According to the present invention, the above-described and other objects are accomplished by providing a new type of doubly-salient permanent magnet machine with stationary permanent magnets mounted in the stator (i.e., a "SP²M" machine). The SP²M comprises a rotor having a multiple of six salient poles spaced at equal angular intervals around a central axis. The motor also includes a stator having a multiple of four salient poles spaced at equal angular intervals. Each of the salient stator poles is wound with a single stator coil, the coils of a pair of diametrically opposed stator poles being connected together in series or in parallel to form a single winding for a pair of salient poles for field excitation. For example, in the two phase, 4/6 stator/rotor pole embodiment there are two stator windings, one per phase, and each stator winding comprises an individual coil wound about each of two diametric stator poles and connected together. Likewise, in the two phase, 8/12 stator/rotor pole embodiment, each of four stator windings is coiled around a pair of diametric stator poles and connected to one phase, etc.

The stator further comprises a plurality of planar permanent magnets mounted diametrically opposite one another in the stator to serve as a means for producing magnetizing flux.

In a second embodiment of the invention the permanent magnets are each sandwiched between a pair of steel insets.

The invention also provides a machine having the same structure and double saliency as described above except that the permanent magnets are replaced by an auxiliary field winding. The auxiliary field winding is excited by DC to provide flux in the magnetic circuit of the machine. It is clear that the invention also provides for a machine having both permanent magnets and auxiliary field windings since both means of excitation can be accommodated simultaneously.

Other objects, features, and advantages of the present invention will become more apparent from the following detailed description of preferred embodiments and certain modifications thereof when taken together with the accompanying drawings.

BRIEF DESCRIPTION OF THE DRAWINGS

FIG. 9 is a cross section of a doubly salient machine similar to FIG. 2, except that one pair of permanent magnets of the embodiment of FIG. 2 has been replaced by auxiliary field windings $F_1$ and $F_2$.

FIG. 10 is a wiring diagram for the embodiment of the invention shown in FIG. 9 when operated as a generator.

DETAILED DESCRIPTION OF THE INVENTION

Figure 1:
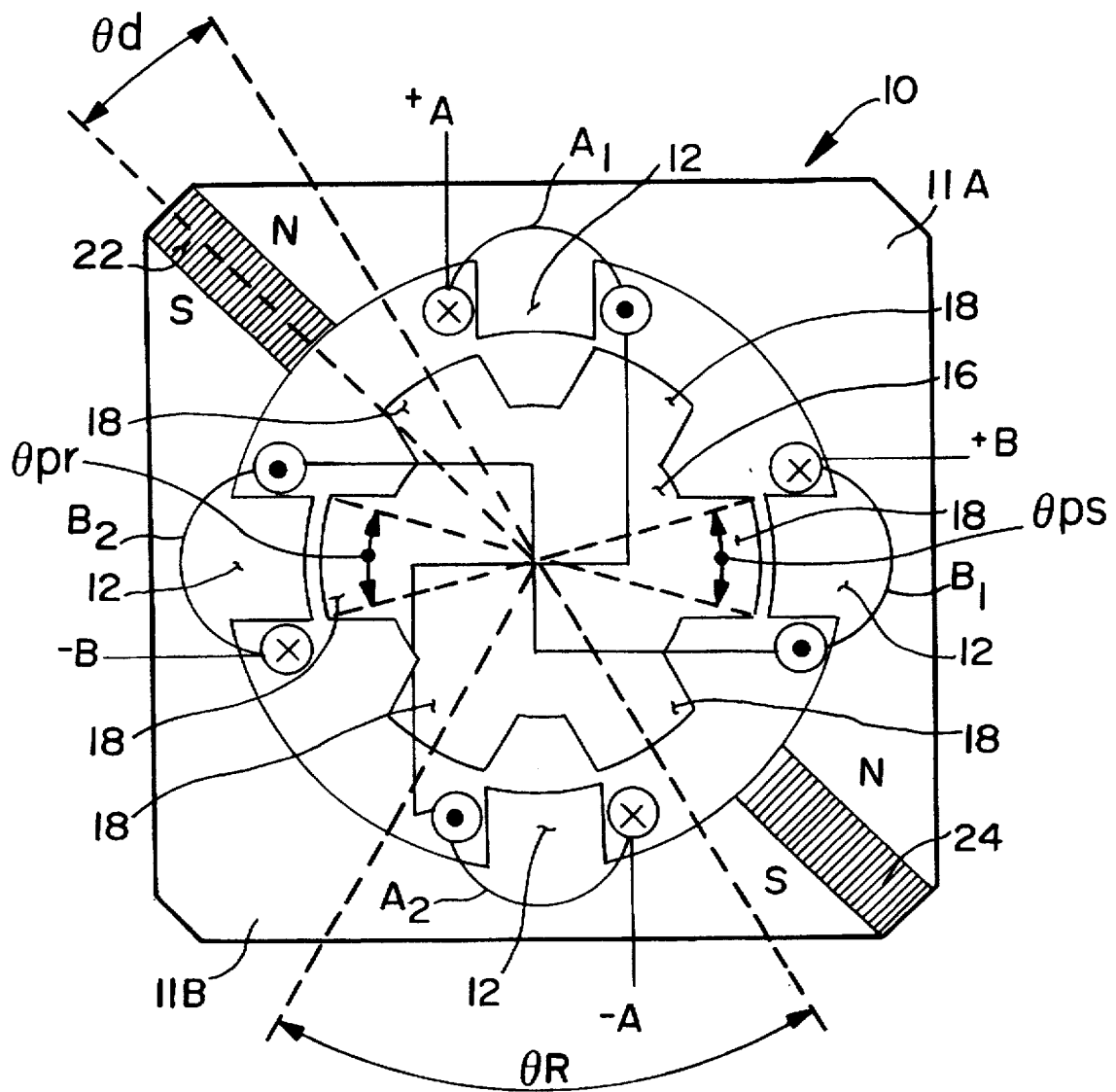
FIG. 1 is a cross-section of a doubly salient stationary permanent magnet machine ($SP^2M$) having four stator poles and six rotor poles according to one embodiment of the present invention.

FIG. 1 shows a cross-section of a doubly salient stationary permanent magnet machine ($SP^2M$) according to one embodiment of the present invention. A stator 10 consists of a plurality of discrete laminated layers, each layer being punched to form a pair of yoke sections 11A, 11B, each section having two salient (or projecting) poles 12 positioned at angular intervals of $\pi/2$ radians. Each pole 12 has a pole arc $\theta_{ps}$ of $\pi/6$ radians.

The rotor 16 also consists of a plurality of discrete laminated layers each of which are punched to form six salient poles 18 positioned at angular intervals $\theta_r$ of $\pi/3$. Each pole 18 also has a pole arc $\theta_{pr}$ equal to or slightly greater than $\pi/6$ radians.

The essential feature is that the total overlapping stator/rotor pole areas should preferably remain constant over 360° of rotation. This way, a constant reluctance is presented to the permanent magnet flux.

In the $SP^2M$ embodiment of FIG. 1, stator 10 is wound with two short pitch windings A and B. Each short pitch winding (for example, the winding A) further comprises two short pitch coils $A_1$ and $A_2$ connected either in series or in parallel so that uniformity of the direction of current in the windings denoted by x's and •'s in FIG. 1 is maintained. The coils as exemplified by $A_1$ and $A_2$ of each winding are wound around a diametrically opposite pair of stator poles 12.

The winding arrangement yields the following exemplary alternating sequence during one complete revolution:

A–B–A–B–A

An essential feature of the embodiment of FIG. 1 comprises two permanent magnets 22 and 24 which are embedded inside the stator 10. The permanent magnets 22 and 24 may be incorporated without unduly increasing the overall motor size. The plurality of discrete laminated layers of stator 10 are each formed of similar punchings 11A and 11B, each having two salient poles 12, positioned with the poles 12 in facing relationship about the stator central axis. Preferably, permanent magnets 22 and 24 are parallelopipeds, and they may be formed by binding multiple smaller magnets into this shape. Magnets 22 and 24 are interposed between the ends of stator punchings 11A and 11B and extend longitudinally along the stator axis. Magnets 22 and 24 are polarized transversely to the stator axis, with like polarities of each magnet facing in the same direction and contacting the same one of punchings 11A or 11B at opposite ends thereof. That is, the north poles of both magnets 22 and 24 face stator punchings 11A and the south poles of both magnets face stator punchings 11B. If desired, the polarities of both magnets may be reversed.

Since the permanent magnets 22 and 24 are stationary, the magnetic force between the stator 10 and permanent magnets 22 and 24 is great enough to hold the permanent magnets in position. Hence, any conventional fixative can be used to secure the permanent magnets 22 and 24.

The permanent magnets 22 and 24 generate the primary flux, and a secondary (armature reaction) flux is induced by the stator pole windings A and B. Due to their air-like permeability, permanent magnets 22 and 24 present a very high constant reluctance which blocks the circulation of the secondary flux through the stator 10.

The particular stator pole 12 and rotor pole 18 arrangement of the present invention ensures that the total overlapped pole area remains constant for all positions of rotor 16. This way, the total air-gap reluctance (which is the primary reluctance for the permanent magnet excitation) is invariant to rotor 16 displacement $\theta_d$, and there exists a substantially linear transfer of permanent magnet flux between adjacent stator poles 12 during rotation of rotor 16. Consequently, permanent magnets 22 and 24 produce no cogging torque at no load.

Since torque is produced as a result of the change of flux linkage in the active stator winding(s) A–B, there is a reaction torque component caused by the interaction of stator winding current and the permanent magnet flux, and there is a reluctance torque component caused by the variation in the reluctance of the magnetic path of the winding A–B. Hence, the present invention works on the variable reluctance principle as well as permanent magnet brushless DC motor principles.

In co-pending application Ser. No. 07/926,765 the ratio of stator poles to rotor poles is inverted as compared to the present invention. In the machine described therein, the stator is equipped with six salient poles wound for three phases and the rotor includes four salient poles. The machine operates in such a manner that only two of the three phases are carrying current at any time. Hence, only ⅔ of the copper of the machine can be considered as "active" at any instant of time.

In the present invention, as embodied in FIG. 1, however, both phases are carrying current at every time instant (except for the brief instants when the current reverses polarity). Hence, it can be accurately said that all of the copper is active at any instant, resulting in an improved utilization of copper within the machine compared to the machine of application Ser. No. 07/926,765.

Figure 2:
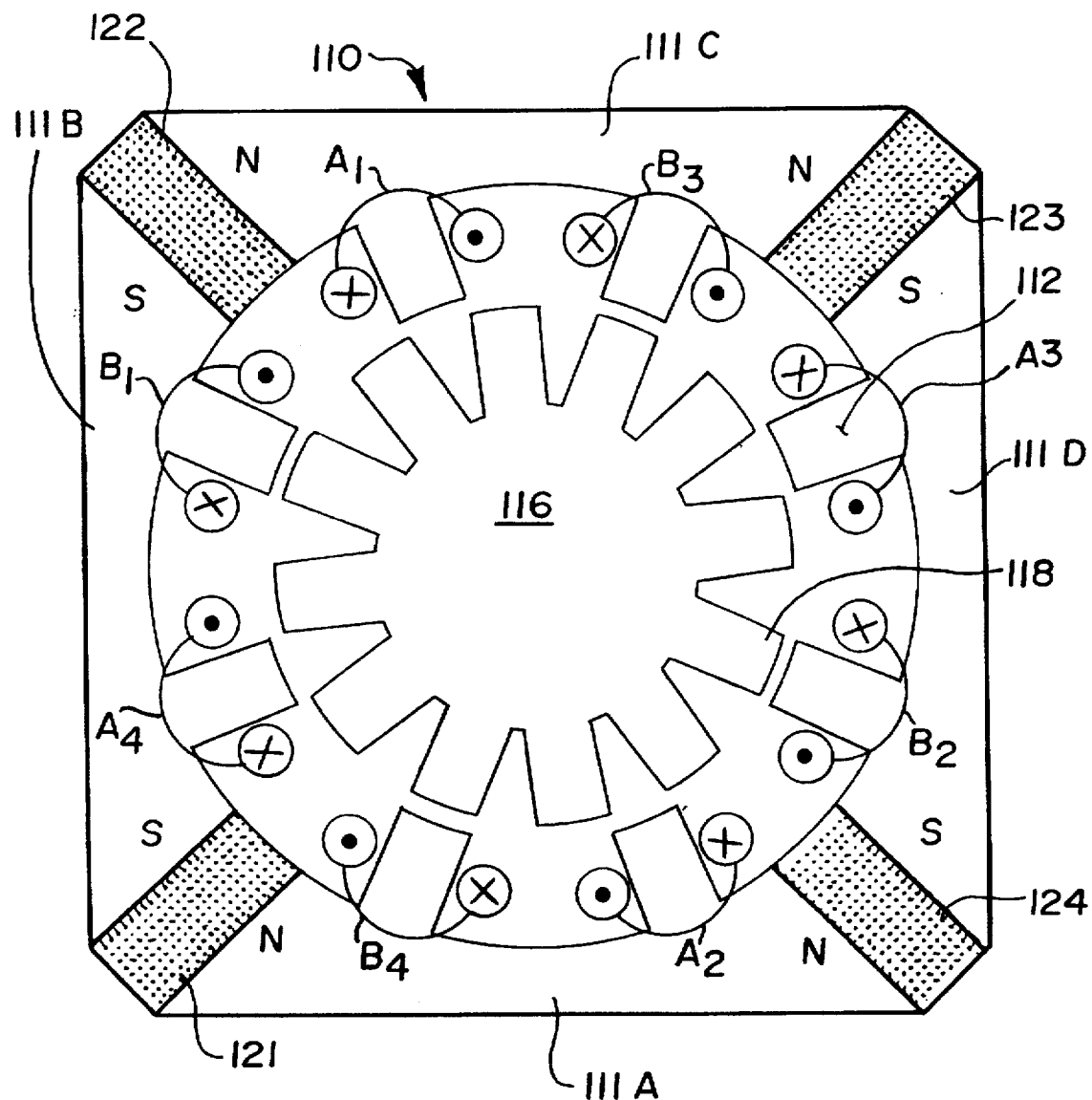
FIG. 2 is a cross-section of a doubly salient stationary permanent magnet machine having eight stator poles and twelve rotor poles according to another embodiment of the present invention.

In the present invention, any multiple of 4/6 stator/rotor poles may be used. For instance, FIG. 2 illustrates the basic structure for a machine incorporating a stator 110 having eight poles and a rotor 116 having twelve poles. The number of permanent magnets is multiplied accordingly, and four such magnets 121–124 are employed in the embodiment of FIG. 2 allowing magnets to be placed in all four corners of the stator. Four similar stator sections 111A–111D, each having two salient poles 112 are used in the embodiment of FIG. 2. The magnets 121–124 are polarized transversely to the central axis of the machine and the magnet faces abutting the opposite ends of each of sections 111A–111D are of like polarity. That is, the faces of magnets 121 and 124 abutting the opposite ends of sections 111A are both north poles and the faces of magnets 121 and 122 abutting opposite ends of sections 111B are both south poles, etc. Each of the stator poles 112 is wound with a coil A1–A4 and B1–B4 and the coils of diametrically opposed stator poles are connected together to form four windings, i.e., A1–A2, A3–A4, B1–B2, and B3–B4.

The principle could be extended to machine with an even higher number of stator poles by utilizing a hexagonally shaped stator and so forth. Alternatively, if desired, a stator with the usual circular outer shape could be used without serious loss of torque producing capability.

Figure 3:
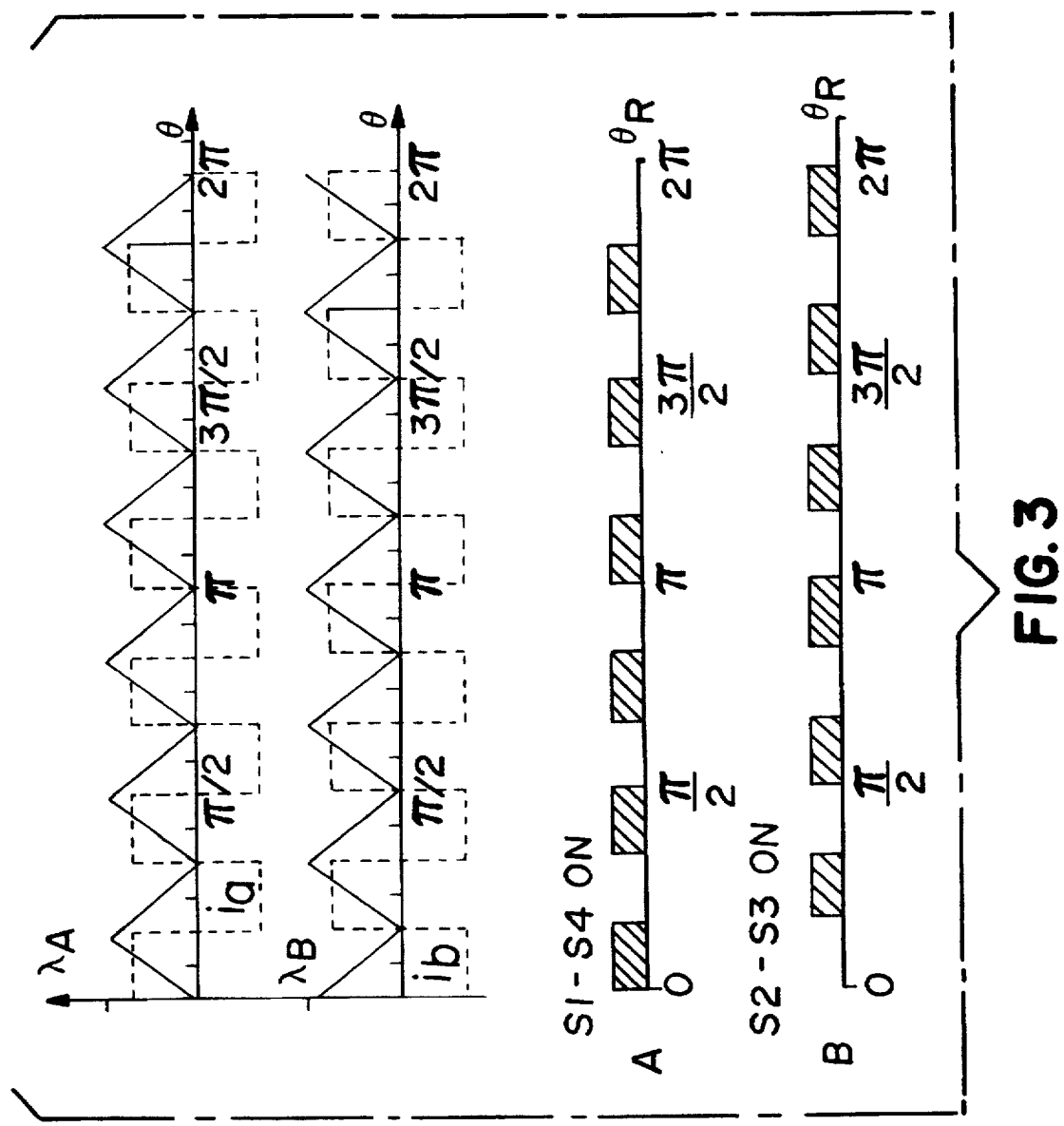
FIG. 3 is a composite graph showing the currents $i_{a-b}$ (in dotted lines) superposed over the corresponding flux linkages $\lambda_{a-b}$ in each of the respective phases A–B resulting from the permanent magnets 22 and 24 in the $SP^2M$ embodiment of FIG. 1. The switching sequences of the switch elements of the converter circuit of FIG. 4 are shown in lines A and B.

As seen in FIG. 3, the flux linkage λa and λb of each stator pole 12 increases at a constant rate for continuing rotor 16 displacement $\theta_d$ until full alignment of a diametric pair of stator poles 12 and rotor poles 18. Past alignment, the flux linkages $\lambda_A$ and $\lambda_B$ of the respective pole pairs decrease at a constant rate.

In the preferred mode of operation as a generator, positive current flows from a given phase when the magnetic flux linking that phase is increasing, and flows into the phase when the magnetic flux is decreasing. For either motoring or generating, each stator winding A, B, etc., typically defines one phase, and each stator winding is coiled about two diametrically opposed stator poles 12. For instance, the SP²M of FIG. 1 is driven as a two-phase machine in which the two stator windings A and B define two phases. However many phases, the doubly-salient structure of the machine allows the production of positive torque over the entire area of overlap of an active stator pole 12 and rotor pole 18 pair. This essentially doubles the torque production when compared with a conventional VRM which can only produce torque while the phase inductance is increasing.

The armature reaction field energy $W_f$, which is to be recovered during current commutation, is greatly reduced because of the much smaller value of the stator 10 inductance. Therefore, the energy ratio, or equivalently, the power factor is very high. The smaller value of the stator inductance also makes the dynamic response of the motor much faster. Specifically, the stator windings A and B meet small permeances at both aligned and unaligned positions, even though a great deal of permanent magnet flux concentration is achieved under the overlapped pole pairs where electromagnetic torque is produced. As a result, the active stator phase winding will experience very small turn-on and turn-off inductances, thereby facilitating short commutation periods upon turn-on and turn-off.

Since the machine of the present invention is endowed with a small turn-off inductance $L_p$ at the aligned pole position, the current in the active winding can decay to zero rapidly after the winding is turned off. It can also be seen in FIG. 3 that the inductance $L_p$ is decreasing after the rotor poles pass the half overlapped position. Hence, the back emf due to the variation of the inductance reverses polarity after the half overlapped position. This reversal of polarity actually assists in the current reversal process because the back emf due to the inductance $L_p$ variation now adds algebraically to the applied voltage before the active winding is turned off. Therefore, it is always possible to power the motor of the present invention using a conventional bi-directional (or bi-polar) converter as well as a conventional unidirectional converter.

Control of the invention can be accomplished in the same manner as a conventional variable reluctance motor, i.e., four quadrant operation is easily achieved by changing the sequence of conduction and the direction of current.

Figure 4:
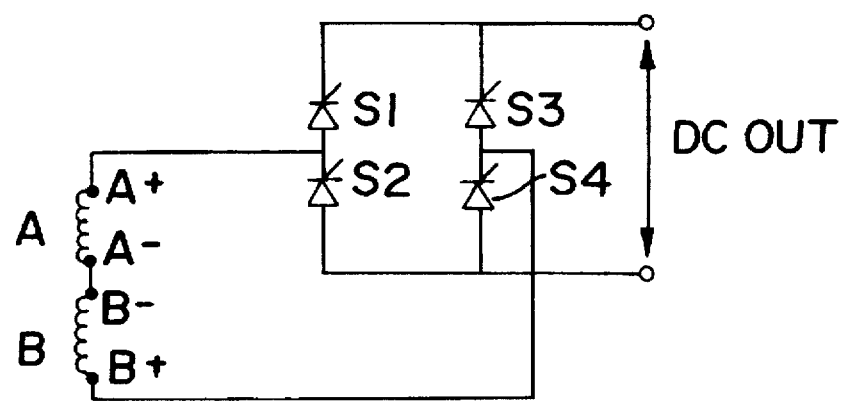
FIG. 4 is a circuit diagram of a converter circuit and stator winding connections which may be employed for operating the $SP^2M$ embodiment of FIG. 1 as a DC generator.

The preferred mode of operation of the present invention is as a generator. DC generator operation may be accomplished using the embodiment of FIG. 1 and a switched converter circuit as shown in FIG. 4. The converter employs a switched solid state bridge having two switch legs, each leg further comprising a pair of series-connected switch devices S1 & S2, S3 & S4. Switch devices S1–S4 may be any suitable gated devices such as diodes, transistors, thyristors, etc. or any combination of these switch devices. The two stator windings A and B are connected in series, with opposite polarities, as a single phase between the switch devices S1 & S2, S3 & S4 of each leg. In operation, the machine is driven to induce current waveforms in the stator windings A and B which are substantially as shown in FIG. 3. The switch devices S1–S4 of FIG. 4 are normally switched in pairs S1 & S4 and S2 & S3, one pair being switched "on" and one pair "off" in an alternating sequence of 30° intervals (as shown in lines A and B of FIG. 3) to convert the otherwise pulsed output to a rectified DC level.

Figure 5:
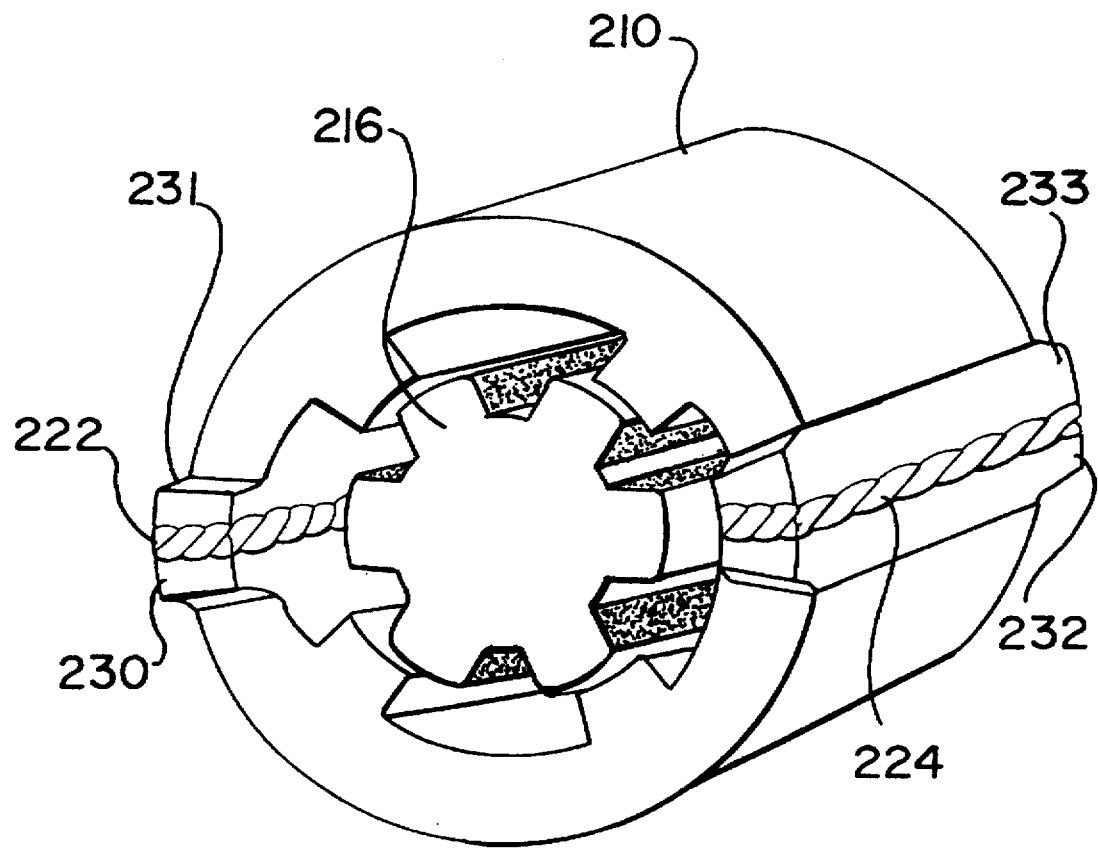
FIG. 5 illustrates a third embodiment of the present invention which has a rounded stator in order to reduce the aspect ratio, i.e., the ratio of the outer diameter of the motor divided by the length.

FIG. 5 illustrates a cross-section of an embodiment of the present invention which has a smaller aspect ratio, i.e., the ratio of the outer diameter of the motor divided by the length. The aspect ratio is smaller because the square-shaped stator of FIG. 1 is replaced with a rounded stator 210. A rotor 216 is similar to the rotor 16 of FIG. 1. As shown in FIG. 5, the permanent magnets 222 and 224 are each sandwiched between two pieces of laminated steel insets 230–233. The steel insets 230–233 are mounted in the stator 210 and extend to the end region of the stator 210. This way, the permanent magnet flux is concentrated into the stator 210 through the respective pairs of laminated steel insets 230 and 231 and 232 and 233. The operation of the embodiment shown in FIG. 5 is in all other respects the same as that described above with respect to FIG. 1.

The advantage of the embodiment shown in FIG. 5 is that the volume of the motor can be reduced. However, a trade-off may occur because the manufacturing cost may be higher.

Figure 6:
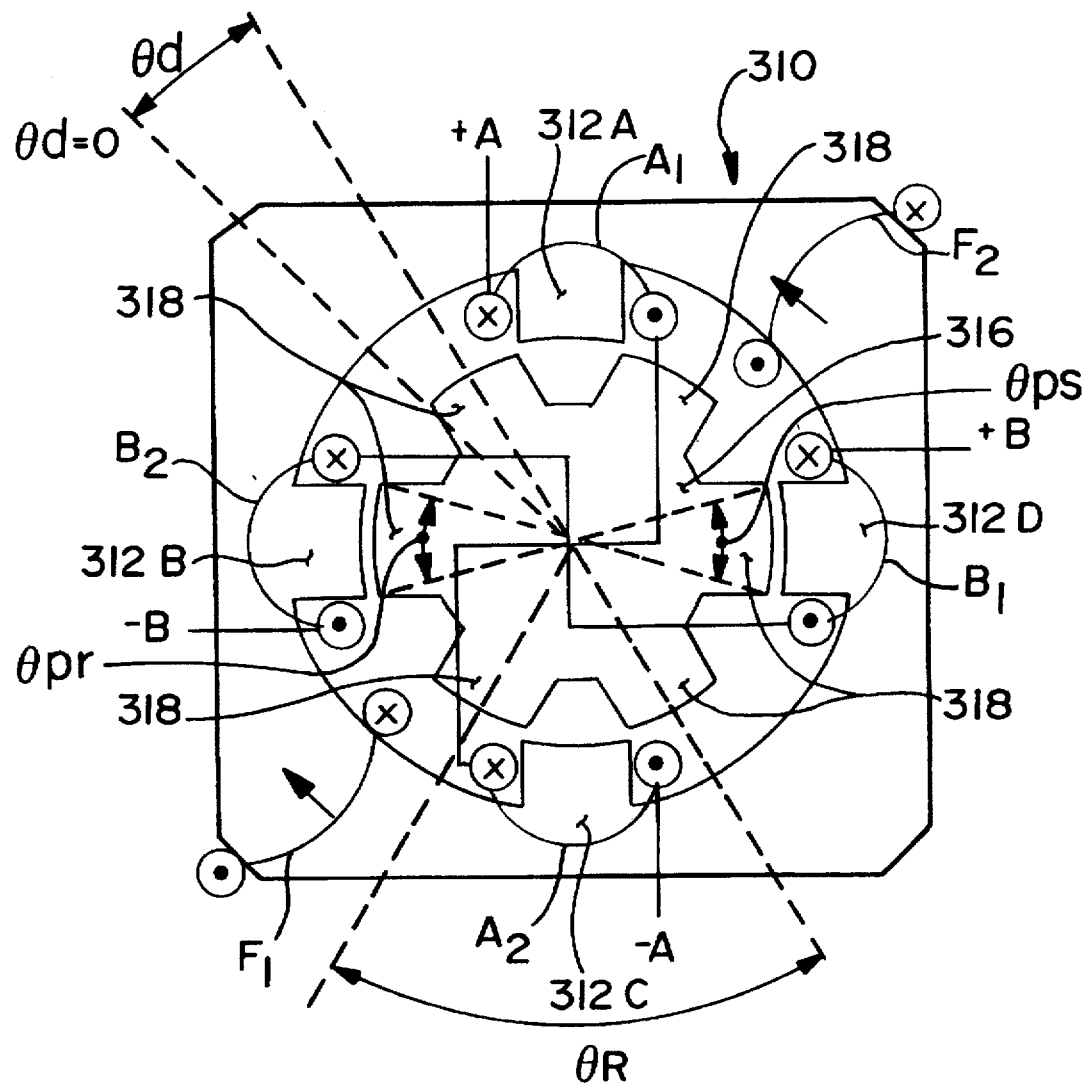
FIG. 6 is a cross-section of a doubly salient machine similar to that of FIG. 1 except that the permanent magnets are replaced by two auxiliary field windings F1 and F2 according to a fourth embodiment of the present invention.

FIG. 6 shows a cross-section of a doubly salient machine according to another embodiment of the present invention. The machine comprises a stator 310 having four salient poles 312A-312D and a rotor 316 having six salient poles 318. Two phase windings A and B comprising coils $A_1$–$A_2$ and $B_1$–$B_2$ are wound about the stator poles 312, as in FIG. 1. The permanent magnets of the embodiment of FIG. 1 have been replaced by a pair of auxiliary field windings F1 and F2. Auxiliary field windings F1 and F2 are both coiled around the wall of the stator core 310 at diametrically opposite locations. Windings F1 and F2 are excited by a current $I_{DC}$ and are polarized so that the flux generated by each winding is in the same direction, as indicated by the arrows. Poles 312A and 312B are thereby polarized as north magnetic poles while poles 312C and 312D are south magnetic poles.

Figure 7:
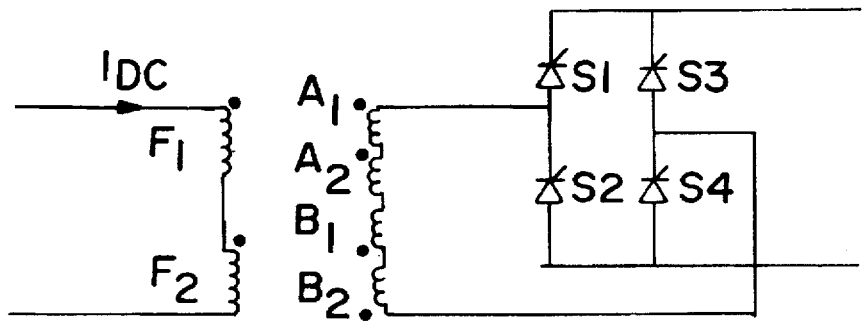
FIG. 7 is a circuit diagram of a converter circuit, stator winding connections, and auxiliary field winding connections which may be employed for operating the embodiment of FIG. 6 as a DC generator.

For motoring operation, a conventional switched converter circuit may be used. For generator operation, a switched converter circuit as shown in FIG. 7 may be employed. The converter employs a switched diode bridge having two switch legs, each leg further comprising a pair of series-connected switch devices S1 & S2, S3 & S4. The two stator windings A and B are connected in series, opposite polarities, as a single phase between the switch devices S1 & S2, S3 & S4 of each leg. In both cases of motoring and generating, the two field windings F1 and F2 are connected in series, same polarities, and are excited by a DC current $I_{DC}$. Alternatively, the two field windings could be connected in parallel so that positive current is again into the dots of both windings noted in FIG. 7. This DC excitation accomplishes the same function as permanent magnets, namely, it provides the stator with excitation (i.e. field) flux thereby allowing for the development of a reaction torque or an induced voltage. The field current times the number of field turns is typically adjusted to such a value to as to mildly saturate the magnetic circuit made up of the stator core, the rotor core and the overlapping stator and rotor poles.

Figure 8:
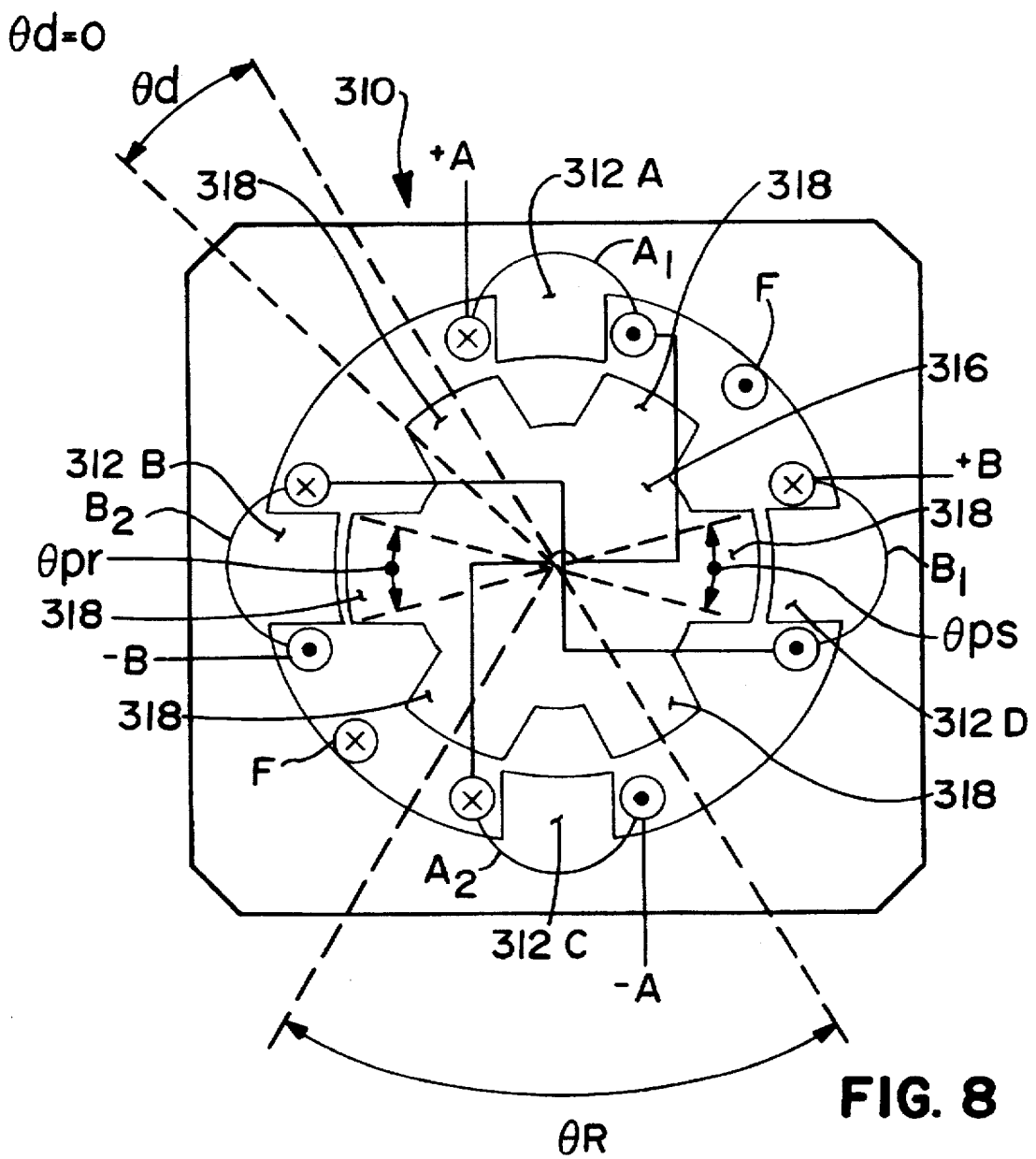
FIG. 8 is a cross-section of a machine similar to that of FIG. 6 except that a single auxiliary field winding F is employed according to a fifth embodiment of the present invention.

FIG. 8 is a cross-section of an alternative embodiment of the doubly salient machine with a single auxiliary field winding F according to the present invention. The machine is similar to the embodiment of FIG. 6 except that the two auxiliary field windings F1 and F2 of FIG. 6 are replaced by a single auxiliary field winding F. The auxiliary field winding F is coiled about the inner periphery of the stator 310 core on diametrically opposite sides. The field winding F, excited by a DC current $I_{DC}$ in the direction shown, generates flux for magnetizing poles 312A and 312B as north magnetic poles and poles 312c and 312D as south magnetic poles. Alternatively, the machine could be equipped with both the permanent magnet arrangement of FIG. 1 and either field coil arrangement of FIG. 7 or 8. In this case the field coil can be used to either reinforce the permanent magnet (field strengthening) or to oppose the magnet field (field weakening). The field strengthening is particularly advantageous when high torque (or high current) is required near zero speed, while field weakening is important when the machine operates beyond is normal speed range. The field strengthening and weakening capability can also be used to regulate the terminal voltage when operated as a generator.

FIG. 9 is a cross-section of another embodiment of the invention which combines the features of the machine using permanent magnets as in FIG. 2 and the machine using an electromagnetic excitation winding as in FIG. 6. The machine shown in FIG. 9 has two diametrically positioned permanent magnets 422, 424; eight stator poles 412A-412H and twelve rotor poles 418. The machine is wound with two phase windings A and B comprising coils $A_1$–$A_4$ and $B_1$–$B_4$ wound on separate stator poles and connected together as shown in FIG. 10. The stator 410 comprises similar yoke sections 411A, 411B, 411D, 411E, each having a single stator salient pole 412, together with similar yoke sections 411C and 411F, each having two stator salient poles. Yoke sections 411A–411F are arranged symmetrically about the rotor 418'. Permanent magnet 422 is embedded in the stator 410 at the adjacent ends of yoke sections 411A and 411B. Diametrically opposite from magnet 422, magnet 424 is embedded in the stator at the adjacent ends of yoke sections 411D and 411E. Auxiliary field windings $F_3$ and $F_4$ are wound longitudinally around yoke sections 411F and 411C, similarly to windings $F_1$ and $F_2$ of FIG. 6. Windings $F_3$ and $F_4$ are preferably located in a plane that is perpendicular to the plane containing magnets 422 and 424. Flux barriers 30 composed of non-magnetic material are interposed in stator 410 at the adjacent ends of yoke sections 411A–411F, 411B–411C, 411C–411D, and 411E–411F to prevent interaction between the magnets 422,424 and the windings $F_3$, $F_4$. In this embodiment windings A1, A2, B1 and B2 are linked by the flux of magnets 422, 424 and 424 while windings A3, A4, B3 and B4 are linked by the flux of field windings $F_3$ and $F_4$. With magnets 422 and 424 polarized as shown and with windings $F_1$ and $F_2$ fed with current $I_{DC}$ in the direction shown, stator poles 412A, 412D, 412E and 412H are magnetized as north magnetic poles and stator poles 412B, 412C, 412E and 412G are magnetized as south magnetic poles.

FIG. 10 is a wiring diagram for the machine of FIG. 9 for operation as a single phase generator. The A windings are all connected in series with the same magnetic polarity as all of the B windings. The A windings and the B windings are then connected in series with opposite magnetic polarity. The field coils $F_1$ and $F_2$ are connected in series (or parallel) with the same magnetic polarity. In this embodiment, positive current of a controlled amount directed into the dotted end of winding $F_1$ establishes flux of such polarity that the voltages induced in windings A3, A4, B3 and B4 are controlled and in phase with the voltages induced in windings A1, A2, B1 and B2 by the permanent magnets. Alternatively, the induced voltages in windings A3, A4, B3 and B4 can be made to be in phase opposition (opposite polarity) with the voltages in windings A1, A2, B1 and B2 when current into the field coils is reversed by supplying positive current of a controlled amount to the undotted end of winding $F_2$. Hence, the induced voltages in the stator coils can be considered as having a constant, uncontrolled voltage (produced by the magnets) and also a controlled voltage (produced by the field coils). In particular, the controlled voltage portion of the induced voltage can be controlled to add to the uncontrolled portion when high torque is required as, for example, starting of a traction motor. On the other hand, the controlled voltage portion of the induced stator voltage can be made to subtract when it is desirable to maintain a constant terminal voltage, as for example, during the so-called field weakening, constant power mode of operation encountered in high speed operation of traction drives or electrical generators as well as many other industrial applications.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

We claim:

1. A permanent magnet machine comprising:
   a rotor mounted for rotation about a central axis, said rotor further comprising,
   a multiple of six salient rotor poles evenly spaced around said central axis and extending outward therefrom; and
   a stator, said stator further comprising,
   a yoke surrounding said rotor;
   a multiple of four salient stator poles extending from said yoke toward said rotor, said stator poles being spaced at equal angular intervals around said yoke and being arranged with respect to said rotor poles to provide a constant air-gap reluctance during rotation of said rotor within said stator,
   a plurality of stator windings each being individually coiled about two diametrically opposite stator poles; and
   a plurality of permanent magnets embedded in said yoke, said magnets being spaced at equal angular intervals around said yoke and being polarized transversely to said central axis to serve as a source of primary flux for magnetizing the machine, said magnets also serving to create a reluctance for blocking the circulation of flux through said yoke.

2. A permanent magnet machine comprising:
   rotor mounted for rotation about a central axis, said rotor further comprising,
   multiple of six salient rotor poles evenly spaced around said central axis and extending outward therefrom; and
   a stator, said stator further comprising,
   a yoke surrounding said rotor;
   a multiple of four salient stator poles extending from said yoke toward said rotor, said stator poles being spaced at equal angular intervals around said yoke and being arranged with respect to said rotor poles to provide a constant air-gap reluctance during rotation of said rotor within said stator,
   a plurality of stator windings each being individually coiled about two diametrically opposite stator poles; and
   a plurality of permanent magnets embedded in said yoke, said magnets being spaced at equal angular intervals around said yoke and being polarized transversely to said central axis to serve as a source of primary flux for magnetizing the machine, said magnets also serving to create a reluctance for blocking the circulation of flux through said yoke, wherein said yoke comprises a plurality of similar sections arranged symmetrically about said central axis, each of said sections having an equal portion of said stator salient poles thereon, and wherein one each of said plurality of permanent magnets is interposed between the ends of two adjacent ones of said yoke sections.

3. A machine as claimed in claim 2, wherein:
   said yoke comprises two sections, each of said sections having two salient poles, and
   said plurality of permanent magnets comprises two permanent magnets, one each of said magnets being interposed between adjacent ends of said two yoke sections, said magnets being polarized such that the like poles of said magnets face the same one of said yoke sections at opposite ends thereof.

4. A machine as claimed in claim 3, wherein:
   said plurality of stator windings comprises two stator windings, each of said stator windings consisting of two coils connected together, each of said coils being wound about one of a pair of diametric stator poles, each of said stator windings being connected to a separate phase of a two-phase source of alternating current.

5. A machine as claimed in claim 3, wherein:
   said plurality of stator windings comprises two stator windings, each of said stator windings consisting of two coils connected together, each of said coils being wound about one of a pair of diametric stator poles, and
   converter means connected to said stator windings for converting the currents induced therein by rotation of said rotor to direct current.

6. A machine as claimed in claim 2, wherein:
   said yoke comprises four sections, each of said sections having two salient poles, and
   said plurality of permanent magnets comprises four permanent magnets, one each of said magnets being interposed between the ends of two adjacent ones of said yoke sections, said magnets being polarized such the poles of the magnets at the opposite ends of each of said yoke sections are of the same polarity.

7. A machine as claimed in claim 6, wherein said multiple of six rotor poles consists of twelve rotor poles.

8. A variable reluctance machine comprising:
   a rotor mounted for rotation about a central axis, said rotor further comprising:
   a multiple of six salient rotor poles evenly spaced around said central axis; and
   a stator surrounding said rotor, said stator further comprising:
   a yoke;
   a multiple of four salient stator poles extending from said yoke toward said rotor, said stator poles being spaced at equal angular intervals around said central axis and being arranged with respect to said rotor poles to provide a constant air gap reluctance during rotation of said rotor within said stator,
   a plurality of stator windings each being individually coiled about two diametrically opposite stator poles, and
   at least one auxiliary winding wound along the length of said yoke on diametrically opposite sides of said yoke to serve as a source of primary excitation flux.

9. The variable reluctance machine of claim 8, wherein said at least one auxiliary winding comprises two auxiliary windings each wound around yoke at diametrically opposite positions, and with additionally, means for energizing said auxiliary windings with direct current such that the flux generated by each said auxiliary winding is polarized in the same direction.

10. A variable reluctance machine comprising:
    a rotor mounted for rotation about a central axis, said rotor further comprising:
    a multiple of twelve salient rotor poles evenly spaced around said central axis; and
    a stator surrounding said rotor, said stator further comprising:
    a yoke;
    eight salient stator poles extending from said yoke toward said rotor, said stator poles being spaced at equal angular intervals around said central axis and being arranged with respect to said rotor poles to provide a constant air gap reluctance during rotation of said rotor within said stator, a plurality of stator windings each being individually coiled about two diametrically opposite stator poles;

first and second permanent magnets imbedded in said yoke diametrically opposite from one another to provide a first portion of the excitation flux of said machine;

first and second auxiliary windings, said auxiliary windings each being wound about said yoke diametrically opposite one another and in a plane that is perpendicular to the plane containing said first and second magnets; and means for energizing said first and second auxiliary windings from a direct current source to provide a second portion of the excitation flux of said machine.

11. A variable reluctance machine as claimed in claim 10, wherein said first and second auxiliary windings are energized such that the flux generated thereby is of a polarity aiding the flux generated by said first and second permanent magnets.

12. A variable reluctance machine as claimed in claim 10, wherein said first and second auxiliary windings are energized such that the flux generated thereby is of a polarity opposing the flux generated by said first and second permanent magnets.

13. A variable reluctance machine as claimed in claim 10, with additionally:

a plurality of flux barriers embedded in said yoke so as to create high reluctance regions in the magnetic circuit of said yoke to prevent interaction between said first and second permanent magnets and said first and second auxiliary windings.

14. A variable reluctance machine as claimed in claim 13, wherein;

said flux barriers each comprise a mass of non-magnetic material.

15. A variable reluctance machine as claimed in claim 14, wherein said plurality of flux barriers comprises four flux barriers;

a first one of said flux barriers being imbedded in said yoke medially between said first permanent magnet and said first auxiliary winding;

a second one of said flux barriers being imbedded in said yoke medially between said first permanent magnet and said second auxiliary winding;

a third one of said flux barriers being imbedded in said yoke medially between said second auxiliary winding and said second permanent magnet; and a fourth one of said flux barriers being imbedded in said yoke medially between said second permanent magnet and said first auxiliary winding.

16. A variable reluctance machine comprising:

a rotor mounted for rotation about a central axis, said rotor further comprising:

a multiple of six salient rotor poles evenly spaced around said central axis; and a stator surrounding said rotor, said stator further comprising:

a yoke;

a multiple of four salient stator poles extending from said yoke toward said rotor, said stator poles being spaced at equal angular intervals around said central axis and being arranged with respect to said rotor poles to provide a constant air gap reluctance during rotation of said rotor within said stator;

a plurality of stator windings each being individually coiled about two diametrically opposite stator poles;

at least two permanent magnets embedded in said yoke, said magnets being spaced at equal angular intervals around said yoke, and at least one auxiliary winding wound along the length of said yoke on diametrically opposite sides of said yoke, wherein said at least two permanent magnets and said at least one auxiliary winding serve as a source of primary excitation flux of said machine, said primary excitation flux including first and second portions, respectively;

wherein the machine further comprises means for energizing said at least one auxiliary winding from a direct current source to provide said second portion of the primary excitation flux of said machine; and wherein said at least two permanent magnets serve as a source of said first portion of said primary excitation flux.

17. The variable reluctance machine of claim 16, wherein said at least one auxiliary winding comprises first and second auxiliary windings, each wound around yoke at diametrically opposite positions, and are energized such that the flux generated by each said first and second auxiliary windings is polarized in the same direction.

18. A variable reluctance machine as claimed in claim 16, wherein said at least one auxiliary winding is energized such that the flux generated thereby is of a polarity aiding the flux generated by said at least two permanent magnets.

19. A variable reluctance machine as claimed in claim 16, wherein said at least one auxiliary winding is energized such that the flux generated thereby is of a polarity opposing the flux generated by said at least two permanent magnets.

* * * * *